(12) United States Patent
McNamee (10) Patent No.: US 9,709,397 B2
(45) Date of Patent: Jul. 18, 2017

(54) LASER LEVEL TRACK ATTACHMENT DEVICE

(71) Applicant: Francis McNamee, Woburn, MA (US)

(72) Inventor: Francis McNamee, Woburn, MA (US)

(*) Notice: Subject to any disclaimer, the term of this patent is extended or adjusted under 35 U.S.C. 154(b) by 0 days.

(21) Appl. No.: 15/224,797

(22) Filed: Aug. 1, 2016

(65) Prior Publication Data

US 2017/0082434 A1 Mar. 23, 2017

Related U.S. Application Data

(60) Provisional application No. 62/220,619, filed on Sep. 18, 2015.

(51) Int. Cl.
*G01C 15/02* (2006.01)
*G01C 15/00* (2006.01)

(52) U.S. Cl.
CPC .................. *G01C 15/002* (2013.01)

(58) Field of Classification Search
CPC .. G01C 15/002; G01C 15/004; G01C 15/105; G01B 11/27
USPC ................................... 33/228, 286
See application file for complete search history.

(56) References Cited

U.S. PATENT DOCUMENTS

| 6,052,911 | A * | 4/2000 | Davis | G01B 11/27 33/286 |
| 6,163,969 | A * | 12/2000 | Jan | G01C 15/008 33/282 |
| 6,167,630 | B1 * | 1/2001 | Webb | B25H 7/00 33/354 |
| 6,247,238 | B1 * | 6/2001 | Harvey | G01C 15/002 33/286 |
| 6,371,626 | B1 * | 4/2002 | Addona | G01C 15/002 33/520 |
| 6,374,507 | B1 * | 4/2002 | Lehto | G01B 11/27 33/286 |
| 6,397,484 | B1 * | 6/2002 | Greene | G01C 15/105 33/392 |
| 6,643,019 | B1 * | 11/2003 | Jeanneret | G01C 15/105 33/286 |
| 6,732,439 | B1 * | 5/2004 | Radke | G01C 15/00 33/263 |
| 7,073,268 | B1 * | 7/2006 | Etter | B23D 59/002 33/286 |
| 7,174,648 | B2 * | 2/2007 | Long | G01C 15/002 33/286 |

(Continued)

*Primary Examiner* — Christopher Fulton
(74) *Attorney, Agent, or Firm* — Mark C. Johnson; The IP Law Firm, PLLC (57) ABSTRACT

In combination with a track assembly having a lower track defining a lower channel spanning a length of the lower track and defining a center plane, wherein an improvement is disclosed that includes having a laser level operably configured to emit a laser in a direction away from an laser output of the laser level in a laser emission plane and having a laser level track attachment device coupled thereto. Further, the improvement includes the laser level track attachment device having a body with a cantilever member that projects in a direction opposite to the direction in which the laser is operably configured to be emitted from the laser level and is sized and shaped to be complementarily received within the lower channel of the lower track such that the laser emission plane is substantially coplanar with the center plane of the lower channel.

16 Claims, 6 Drawing Sheets

(56) References Cited

U.S. PATENT DOCUMENTS

| | | | | |
|---|---|---|---|---|
| 7,243,431 B2* | 7/2007 | Godwin | ................... | B60D 1/36 |
| | | | | 280/477 |
| 7,499,186 B2* | 3/2009 | Waisanen | ................... | B61B 3/00 |
| | | | | 33/287 |
| 7,654,006 B1* | 2/2010 | Mooney | ............... | G01B 11/272 |
| | | | | 33/286 |
| 7,793,423 B2* | 9/2010 | Loftis | ....................... | F16L 1/10 |
| | | | | 33/286 |
| 8,209,874 B1* | 7/2012 | Tribble | ................ | G01C 15/004 |
| | | | | 33/227 |
| 8,302,319 B1* | 11/2012 | Chen | .................... | G01C 15/004 |
| | | | | 33/286 |
| 2001/0049879 A1* | 12/2001 | Moore, Jr. | ............ | G01C 15/008 |
| | | | | 33/376 |
| 2010/0122466 A1* | 5/2010 | Hemingway | ........ | G01C 15/004 |
| | | | | 33/228 |
| 2014/0223750 A1* | 8/2014 | Diefenderfer | ........ | G01B 11/272 |
| | | | | 33/286 |

* cited by examiner

LASER LEVEL TRACK ATTACHMENT DEVICE

CROSS-REFERENCE TO RELATED APPLICATION

This application claims priority to U.S. Provisional Patent Application No. 62/220,619 filed Sep. 18, 2015, the entirety of which is incorporated by reference.

FIELD OF THE INVENTION

The present invention relates generally to laser level attachment devices utilizing a track, and, more particularly, relates to a device used to attach a laser level to a track in order to ascertain a corresponding ancillary track location.

BACKGROUND OF THE INVENTION

Laser levels are well-known devices used in the construction industry and/or when installing structures such as televisions and windows. Laser levels typically emit a laser beam (or light amplified so it can be visually perceived) in a vertical or horizontal axis that can be seen by a user. In some instances the laser level may be rotary, wherein it can spin to create a vertical or horizontal plane. Laser levels facilitate, for example, in identifying a target area for use by the user or aligning one structure with another structure. One specific example application of a laser level's advantageous use in aligning structures includes the installation of sliding door frames. In said example, a door is operably configured to slide on two opposing tracks, i.e., an upper track and a lower track. Before the door is installed, the tracks are installed, and require alignment with one another so the door can slide back-and-forth without being inhibited by the track.

Those known laser levels are shaped, sized, and/or configured in a manner such that they do not make it conducive for users to employ their use with the installation of tracks or other structures requiring alignment. Some known laser levels are too cumbersome for the user to handle, while other known levels that are relatively easy to handle do not provide an effective or efficient means for the level to attach to or rest on one component of the track assembly (e.g., the lower track) while the user installs the other corresponding component of the track assembly (e.g., the upper track). As such, use of these laser levels would require two users for installation, one to hold the level and another to install the corresponding component. This creates obvious cost and timing inefficiencies and may be impractical or impossible if there is only one user. Moreover, even if there are two users or if the level is able to rest on, for example, the lower track, it is possible that the level may not have been accurately placed on the lower track or the track may shift during installation, causing misalignment of the upper track. Those levels that are "self-leveling" also do not solve the above-described deficiencies because they too are unable to effectively rest or properly align with the lower track.

Therefore, a need exists to overcome the problems with the prior art as discussed above.

SUMMARY OF THE INVENTION

The invention provides a laser level track attachment device that overcomes the hereinafore-mentioned disadvantages of the heretofore-known devices and methods of this general type and that attaches to the laser level or may be incorporated into a laser level itself, wherein the device fits into a bottom track and enables the laser level to indicate exactly where to install the top track for ascertaining precise alignment or targeting.

With the foregoing and other objects in view, there is provided, in accordance with the invention, an improvement that includes a track assembly having a lower track defining a lower channel spanning a length of the lower track and defining a center plane, wherein the improvement also includes a laser level having a laser level track attachment device coupled thereto and being operably configured to emit a laser in a direction away from an laser output of the laser level and in a laser emission plane. The laser level track attachment device beneficially includes a body with a cantilever member that projects in a direction opposite to the direction in which the laser is operably configured to be emitted from the laser level and is sized and shaped to be complementarily received within the lower channel of the lower track such that the laser emission plane is substantially coplanar with the center plane of the lower channel.

In accordance with another feature, an embodiment of the present invention includes a lower channel width defined by inner surfaces of two opposing sidewalls of the lower track, respectively, wherein the two opposing sidewalls of the lower track defining the lower channel and also includes a cantilever member width separating two opposing outer side faces of the cantilever member. The cantilever member width is of a dimension less than, and at most approximately $\frac{1}{32}$ of an inch within, a dimension of the lower channel width.

In accordance with yet another feature, an embodiment of the present invention includes the cantilever member having a center plane defined by a midpoint between two opposing outer side faces of the cantilever member, wherein the center plane of the cantilever member is substantially coplanar with the laser emission plane and with the center plane of the lower channel.

In accordance with an additional feature, an embodiment of the present invention also includes the body of the laser level track attachment device having a body fastener, wherein the laser level track attachment device is removably couplable to the laser level through the body fastener. In further embodiments, an alignment indicia is disposed on an outer surface of the body and indicates the center plane defined by the cantilever member.

In accordance with yet another feature, an embodiment of the present invention also includes the body also having a substantially planar upper surface for supporting the laser level, a lower surface (opposing the upper surface of the body), and a bore defined by the body and spanning from the lower surface of the body to the upper surface of the body, wherein the bore has the body fastener disposed therein.

In accordance with a further feature, another embodiment of the present invention includes the body fastener having a head, a distal end, and threads spanning from the distal end to a location along a fastener length. The body fastener may be also operably configured to be placed in a position along a fastener translation path with the head recessed within the lower surface and the distal end of the body fastener projecting away from the upper surface of the body.

In accordance with a further feature of the present invention, the cantilever member is sized and shaped to slidably translate within the lower channel of the lower track, thereby enabling the laser level to translate along the lower track.

In accordance with the present invention, a laser level track attachment device is also disclosed that includes the attachment device being removably couplable to a laser level and having a body with (1) a platform having a substantially planar upper surface defining an upper aperture and a substantially planar lower surface opposing the upper surface of the platform and (2) a cantilever member projecting from the lower surface of the platform in a direction away from the upper surface of the platform to define two platform flanges, wherein the cantilever member has a distal end, defines a distal aperture, and has a bore spanning from the distal aperture of the cantilever member to the upper aperture of the platform. The laser level track attachment device also includes a threaded fastener disposed within the bore, has a head, and operably configured to be placed in a position along a fastener translation path with the head recessed within the distal end of the cantilever member.

In accordance with a further feature of the present invention, the distal end of the cantilever member includes a distal area defined by perimeter edges of the distal end of the cantilever member and defines a distal plane, and the substantially planar upper surface of the platform includes an upper area defined by perimeter edges of the upper surface of the platform and defining an upper plane, wherein the upper plane of the platform and the lower plane of the cantilever member being parallel and noncoplanar.

In accordance with yet another feature, an embodiment of the present invention includes the cantilever member having a trailing end, a leading end opposing the trailing end, and a cantilever member length separating the trailing and leading ends of the cantilever member, along with a cantilever member width separating two opposing outer side faces of the cantilever member disposed between the trailing and leading ends of the cantilever member, wherein the cantilever member width is of a substantially uniform dimension spanning the cantilever member length.

In accordance with a further feature of the present invention, the two platform flanges include the substantially planar lower surface of the platform, each having uniform widths spanning from an outer side face of the cantilever member to an outer edge of the platform. Further, the cantilever member may also be centrally disposed on the lower surface of the platform.

In accordance with the present invention, a method of aligning two complementary track structures with a laser level has been disclosed that includes the steps of (1) providing a track assembly having a lower track defining a lower channel spanning a length of the lower track and defining a center plane, (2) providing a laser level operably configured to emit a laser in a direction away from a laser output of the laser level and in a laser emission plane, (3) providing a laser level track attachment device including a body with a cantilever member, (4) coupling the lower track to a building structure to expose the lower channel, (5) inserting the cantilever member into the lower channel of the lower track such that the cantilever member is placed in an extraneously unbiased position to align the laser emission plane with the center plane of the lower channel, and (6) emitting the laser from the laser level to project a corresponding installation location for an upper track of the track assembly.

In accordance with another feature, an embodiment of the present invention also includes sliding the cantilever member within the lower channel after inserting the cantilever member into the lower channel and after emitting the laser from the laser level.

Although the invention is illustrated and described herein as embodied in a laser level track attachment device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention. Moreover, while particularly advantageous to laser levels, it may be applicable to, and the term laser levels should be defined to include, other levels such as chalk levels and may also be applicable to devices that do not emit lasers, but rather utilize other light emission techniques.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to a direction in which the component of the device translates, rests within, or couples to, a track.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
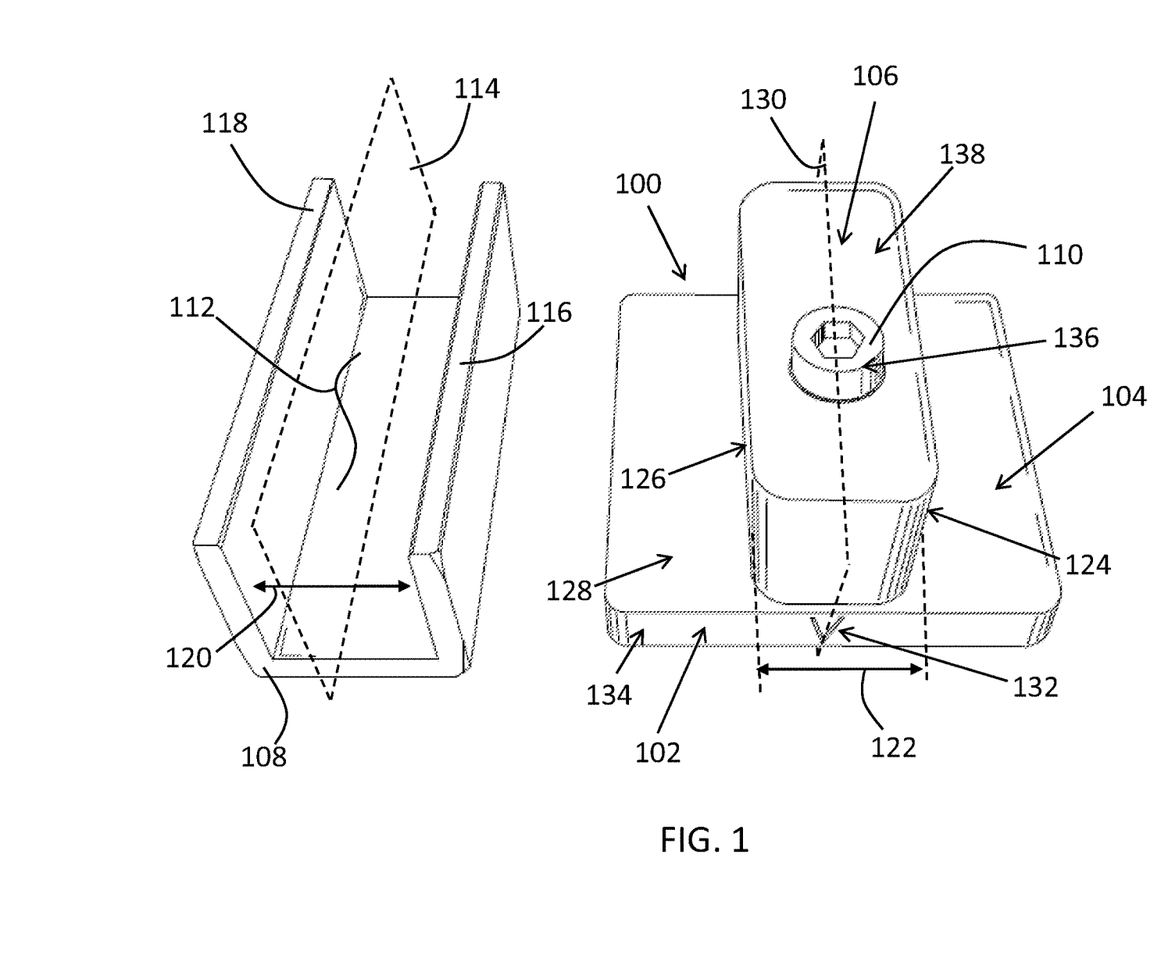
FIG. 1 is a fragmentary perspective view of an exemplary track side juxtaposed with a laser level track attachment device in accordance with one embodiment of the present invention.
Figure 2:
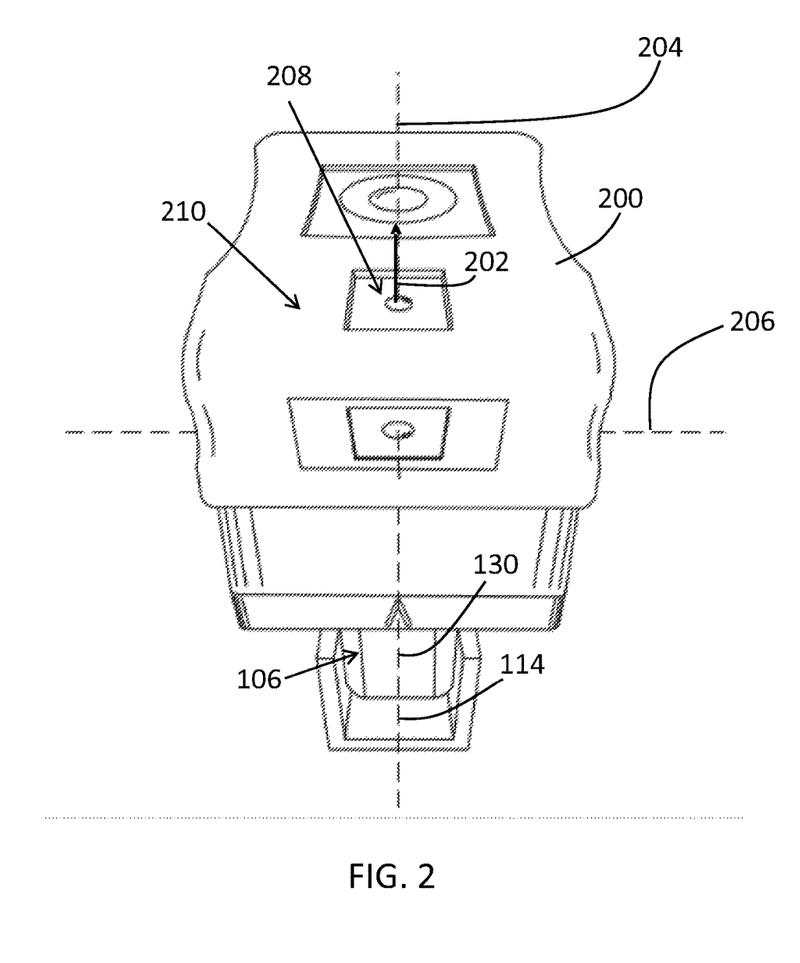
FIG. 2 is a perspective view of the track and device of FIG. 1 coupled to an exemplary laser level in accordance with the present invention.
Figure 3:
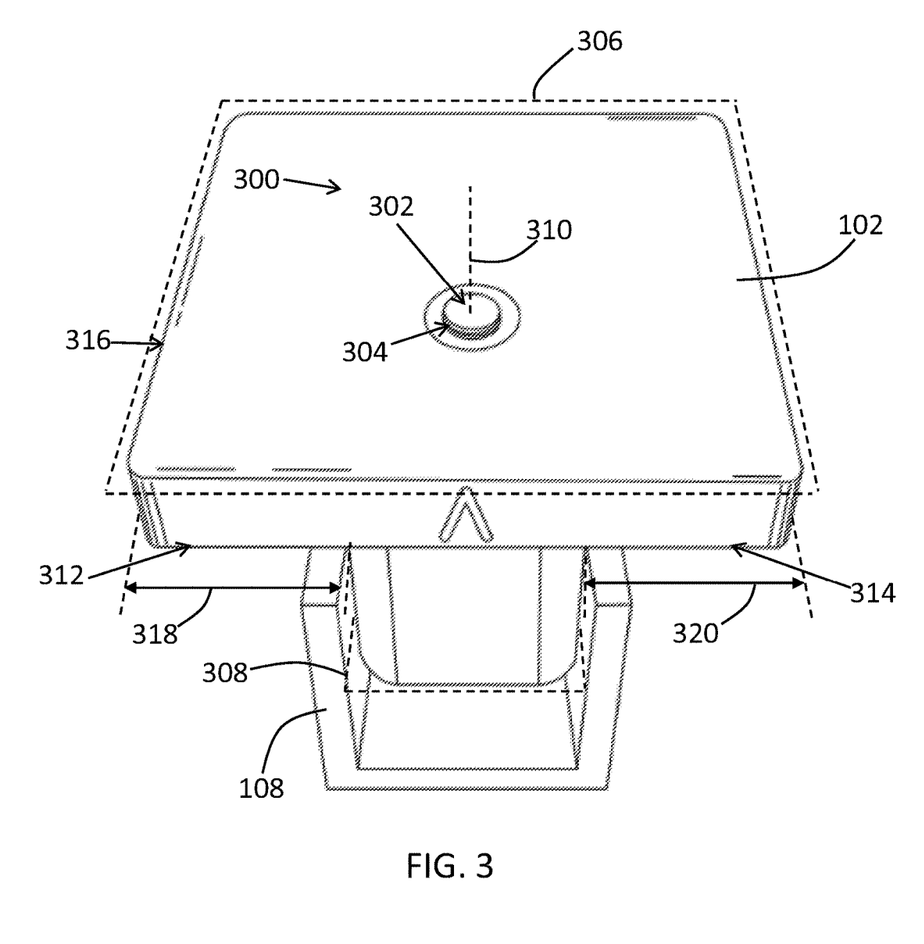
FIG. 3 is a perspective view of the track and device of FIG. 1 coupled to one another.

The present invention provides a novel and efficient laser level track attachment device and method of use in combination with a laser level that effectively and efficiently enables users to install, for example, window and door tracks in building structures, such as houses, condos, commercial buildings, among others. Referring now to FIG. 1, one embodiment of the present invention is shown, in combination with a fragmentary view of an exemplary track, in a downward-looking perspective view. FIG. 1 shows several advantageous features of the present invention, but, as will be described below, the invention can be provided in several shapes, sizes, combinations of features and components, and varying numbers and functions of the components. The first example of a laser level track attachment device 100, as best shown in FIGS. 1-3, includes a body 102 with a platform 104 and a cantilever member 106 that is sized and shaped to fit within a track 108. In one embodiment, the body 102 is a unitary and rigid unit, formed, for example, by a casting, injection molding, or milling process, and made of a material such as 6061 aluminum or stainless steel. The body 102 may also be made with a ceramic or polymeric material and may be formed by joining the platform 104 and cantilever member together through one or more fasteners, adhesive, or welding.

In one embodiment, the track attachment device 100 is integrally formed as part of the laser level 200, while in other embodiments the track attachment device 100 is removably coupled to the laser level 200 through a fastener 110 such as a screw or bolt. The exemplary track 108 shown in FIG. 1 is part of a track assembly (shown best in FIG. 4) that may also include another track, e.g., upper track 400, which is the exact or similar dimension as the lower track 108. The lower track 108 defines a lower channel 112 spanning a length of the lower track 108 and defining a center plane (represented in FIG. 1 as element 114). In one embodiment, the lower channel 112 is defined by two opposing side walls 116, 118, respectively, and has a width 120 defined by inner surfaces of two opposing sidewalls 116, 118. The width 120 of the track 108 may be uniform as it spans the length of the track 108. In the preferred embodiment, it is the entire length of the track.

The cantilever member 106 is advantageously sized and shaped such that it is operably configured to be complementarily received within the lower channel 112 such that a laser (represented in FIG. 2 as element 202) operably configured to be emitted from the laser level 200 that is in a laser emission plane (represented in FIG. 2 as element 204) that is substantially coplanar with the center plane 114 of the lower channel 112. In such an advantageous configuration, a user can now effectively and efficiently project a corresponding installation location for the upper track 400 of the track assembly, so that a window, door, or other structure can slide or be installed properly within both the lower and upper tracks 108, 400. As a laser level 200 may be operable to project lasers, e.g., laser 206, at approximately orthogonal angles to one another (which may be beneficially many users), the corresponding installation location may also be a side track. The cantilever member 106 is complementarily received in the lower channel 112 such that one or more of the cantilever member's dimensions (width or length) substantially meets (within +/−0.5 inches) or exceeds one or more of the corresponding dimensions (width or length) of the channel 112.

In one embodiment, the cantilever member 106 has a width (represented in FIG. 1 as element 122), separating two opposing outer side faces 124, 126 of the cantilever member 106, that is a dimension less than, and at most approximately 1/32 of an inch within, a dimension of the lower channel width 120. Further, with brief reference to FIG. 5, the cantilever member 106 may also include a trailing end 508, a leading end 510 opposing the trailing end 508, and a cantilever member length 512 separating the trailing and leading ends 508, 510. Advantageously, the cantilever member width 122 may be of a substantially uniform dimension spanning the cantilever member length 512 so as to ensure the cantilever member 106 can slide within the channel 112 and sits evenly on or within the track 108.

For example, in one embodiment, the cantilever member 106 is shaped to have a width 122 of approximately 745 mils and designed to fit in a complementary fashion within the lower channel 112 having a width 120 of approximately 775 mils. To facilitate in balancing the laser level track attachment device 100 when placed within a track, and to effectively permit the attachment device 100 to slide within the channel 112, the center plane 130 of the cantilever member 106 is substantially coplanar (i.e., +/− approximately 0.1 inches) with the laser emission plane 204 and with the center plane 114 of the lower channel 112. The center plane 130 is defined by a midpoint between the two opposing sides 124, 126 of the cantilever member 106, wherein the midpoint may be the geometric center or the center of mass of the cantilever member 106. Said even further, the cantilever member 106 is sized and shaped to slidably translate within the lower channel 112 of the lower track 108, thereby enabling the laser level 200 to translate along the lower track 108 and project a laser 202 to a corresponding installation location (as shown best in FIG. 4).

As discussed above, the attachment device 100 may be integrated within the laser level 200 or removably coupled thereto with a body fastener 110, such as a threaded screw. In one embodiment, the body 102 may also include an alignment indicia 132 disposed on an outer surface 134 of the body 102. The alignment indicia 132 may be a raised or recessed line, arrow, or other shape or object indicating where the center plane 130 of the cantilever member 106. In other embodiments, the alignment indicia 132 may be painted or imprinted on the outer surface 134 of the body 102 by other methods.

Figure 5:
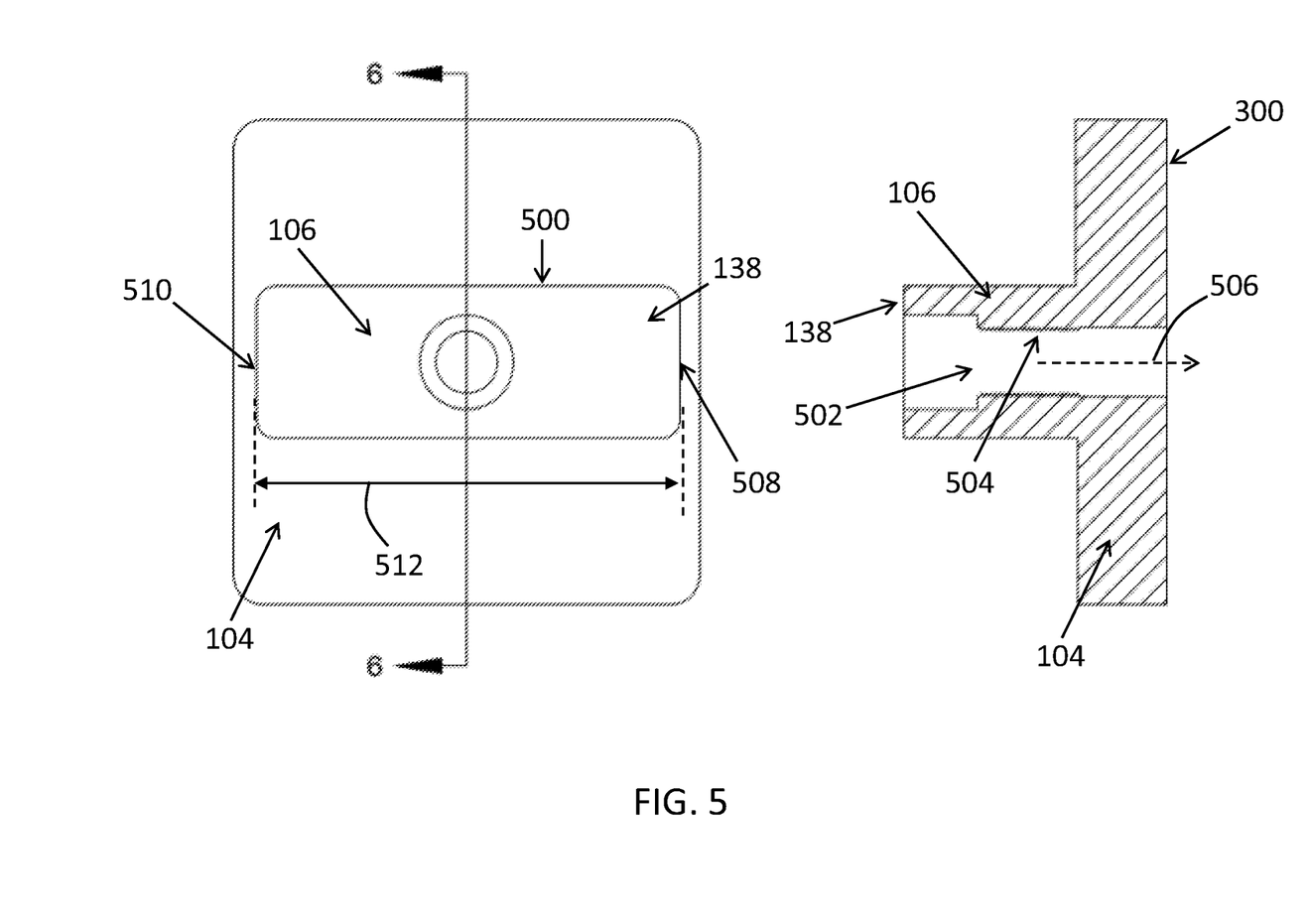
FIG. 5 is a top plan view of the track attachment device of FIG. 1 juxtaposed next to a cross-sectional view of the track attachment device along section line 6-6.

With reference now to FIG. 1 in connection with FIG. 5, the upper surface of the body 102, or platform 104, may be substantially planar (or not having a raised contour of more than approximately 0.1 inches above level—or the generally level surface of the platform) upper surface 300 for supporting the laser level 200. The body 102, or cantilever member 106, may also include lower surface 138, opposing the upper surface 300 of the body 102. The lower surface 138 may also be substantially planar. The body 102 may define a bore 502 spanning from the lower surface 138 to the upper surface 300 to provide space for the body fastener 110 to be deposed therein for securing the attachment device 100 to the laser level 200. With reference to FIGS. 1, 3, and 5, the body fastener 110 includes a head 136 (which may include the proximal end of the fastener 110), a distal end 302, and threads 304 spanning from the distal 302 end to a location along a fastener length defined by the proximal end and distal end 302 of the fastener 110. The fastener 110 may be metallic, polymeric or another material. The fastener 110 may also have a geometrically center axis 310 that is aligned with or parallel to the center plane 130 of the cantilever member 106 to ensure the The head 136 may be formed in a variety of known shapes, including a slot, Phillips, hex, or other shapes permitting the user to rotate the fastener 110 within the bore 502 having corresponding threading 504 disposed on the internal surface of the bore 502. In one advantageous embodiment, the threading 504 only spans within the bore 502 for a length to permit the head 136 of the fastener 110 at least partially or fully recess within the bore 502, yet permit the distal end 302 and threading 304 protrude enough (approximately 0.25-1.5 inches) to secure the laser level 200 to the attachment device 100. Said differently, the body fastener 110 is operably configured to be placed in a position along a fastener translation path (represented with arrow 506 in FIG. 5) with the head 136 recessed (at least partially or fully) below the lower surface 138 (distal end of the cantilever member 106) and the distal end 302 of the body fastener 110 projecting away from the upper surface 300 of the body 102 (as shown best in FIG. 3). FIG. 5 depicts an exemplary spatial configuration of the bore 502 to provide the threaded fastener 110 the means to travel there-through along the translation path 506.

With reference specifically to FIGS. 1, 3, and 5, the upper surface 300 of the body 102 may be substantially planar. The upper surface 300 may also define an upper plane (represented with numeral 306) and the lower surface 138 of the body 102 defines a lower plane (represented with numeral 308). The upper plane 306 and lower plane 308 are parallel and noncoplanar to ensure the laser level 200 is balanced and level after the cantilever member 106 is placed within the channel 112. In one embodiment, the distal end 138 of the cantilever member 106 includes a distal area defined by perimeter edges 500 of the distal end 138 and defines the distal plane 308. Similarly, the substantially planar upper surface 300 of the platform 104 may also include an upper area that is also defined by the perimeter edges 316 and defines the upper plane 306.

In one embodiment the cantilever member 106 can be seen projecting from the lower surface 128 of the platform 104 in a direction away from the upper surface 300 of the platform 104 to define two platform flanges 312, 314. The cantilever member 106 may also be centrally disposed on the lower surface 128 of the platform 104 to ensure the weight of the laser level 200 is uniformly distributed and to ensure the laser 202 emitted from the laser level 200 emits to a corresponding and aligning installation location for another track forming the tracking assembly.

The flanges 312, 314 project outwardly from a location on the platform 104 where the cantilever member 106 is attached and provides support, guidance, or a coupling location when, in one application, the cantilever member 106 is inserted within the channel 112. To further ensure the stability and uniformity of load when supporting the laser level 200, the two platform flanges 312, 314 include the substantially planar lower surface 128 of the platform 104 and, in one embodiment, have uniform widths (represented, respectively, with arrows 318, 320) spanning from an outer side face of the cantilever member 106 to an outer edge of the platform 104. These uniform widths 318, 320 may also extend the entire length of the platform 104.

The laser level 200 includes an output 208 where the laser 202 is emitted. The laser level 200 may be oriented such that it is emitted in a direction away from both the laser output 208 and the direction in which the cantilever member 106 extends from the lower surface 128 of the platform 104. Said another way, the cantilever member 106 projects from the lower surface 128 of the platform 104 in a direction opposite to the direction in which the laser 202 is operably configured to be emitted from a top surface 210 of the laser level 200. The cantilever member 106 may also be said to project from the lower surface 128 in a direction away from the upper surface 300 (best shown in FIG. 3) of the platform 104.

Figure 4:
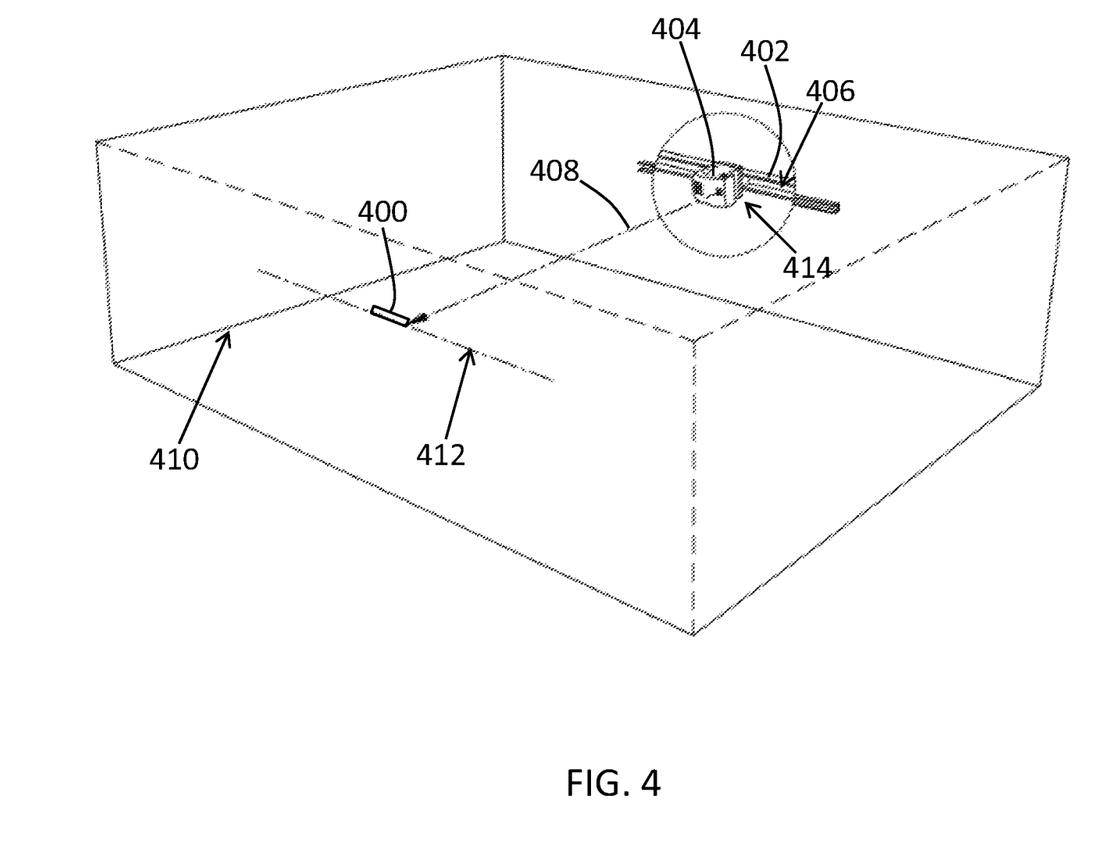
FIG. 4 is a partially transparent, fragmentary, downward-looking perspective view of the laser lever coupled to a lower track attached to a wall and projecting a corresponding installation location for an upper track.
Figure 6:
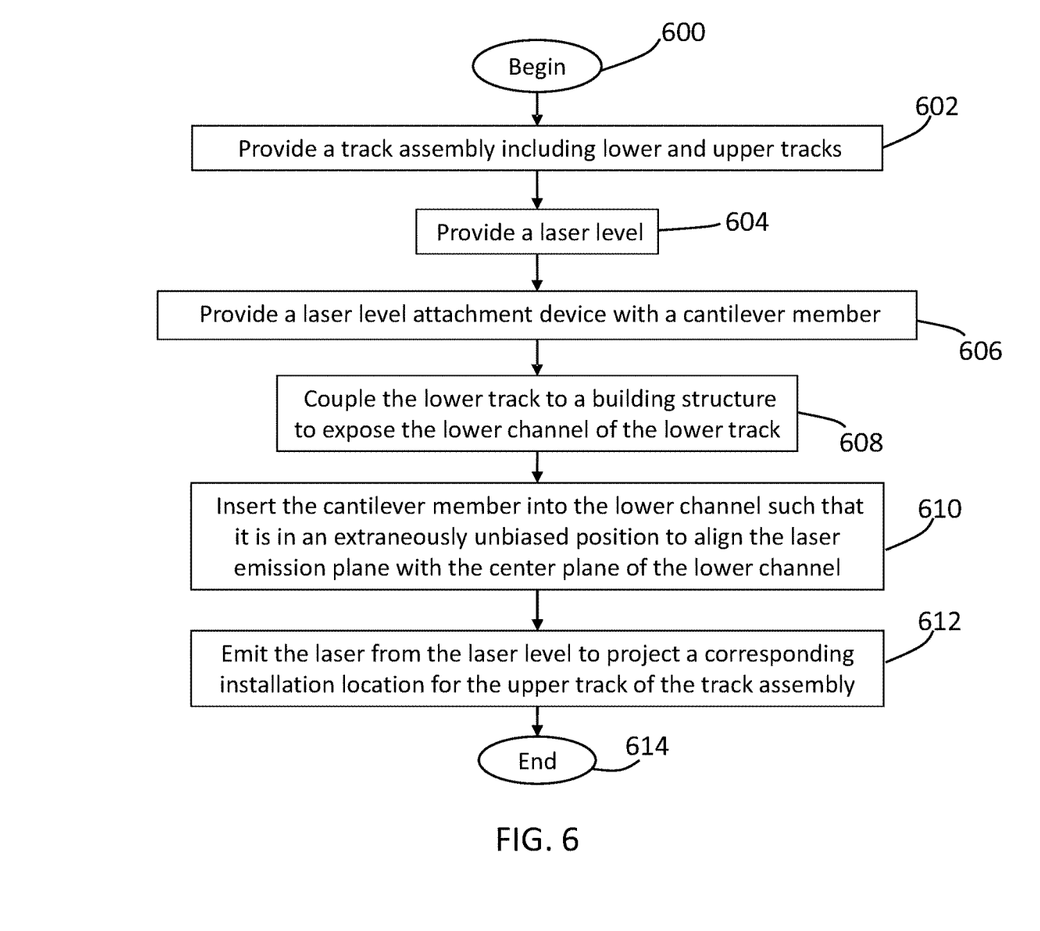
FIG. 6 is a process flow diagram of a method of aligning two complementary track structures with a laser level.

FIG. 4 will be described in conjunction with the process flow chart of FIG. 6. Although FIG. 6 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 6 for the sake of brevity. In some embodiments, some or all of the process steps included in FIG. 6 can be combined into a single process. FIG. 6 depicts steps illustrating a method of aligning two complementary track structures, e.g., tracks 400, 402, with a laser level 404.

The process begins at step 600 and immediately proceeds to step 602 of providing a track assembly having a lower track 402 defining a lower channel 406 spanning a length of the lower track 402 and defining a center plane, e.g., plane 114 shown in FIG. 1. Unless expressly stated herein, the tracks 400, 402 may be considered to be "upper" and "lower" based on the typical orientation in which they are installed, but aren't necessarily limited to the same because, as described above, the device and method may be operable to produce orthogonally placed corresponding track installation locations. Additionally, the device and method may be operable to project a lower corresponding track installation location if the cantilever member 106 is shaped to provide sufficient frictional resistance with an upper track to support the weight of the laser level. Alternatively, the cantilever member 106 may include a spring-loaded mechanism used to exert compression forces against two side surfaces of the upper track.

Next, step 604 includes providing a laser level 404 operably configured to emit a laser 408 in a direction away from a laser output of the laser level 404 and in a laser emission plane, e.g., plane 204 shown in FIG. 2. Step 606 includes providing a laser level track attachment device 414 that has a body with a cantilever member, which may also include a platform and other features described in more detail above.

The process continues to step 608 of coupling the lower track 402 to a building structure 410 to expose the lower channel 406 of the lower track 402. Said another way, the lower track 402 may be installed to a building structure 410, such as a window sill or doorway, wherein the building structure 410 defines an opening for structures such as a window or door. FIG. 4 depicts a fragmentary view of an exemplary building structure 410. The coupling of the track 402 to the building structure 410 will not be described with great detail, as those methods are known to those of skill in the art. For example, however, the track 402 may be coupled to the building structure 410 using fasteners such as screws. The lower channel 406 of the track is exposed in that it is disposed for receiving the cantilever member of the attachment device 414. The channel 406 may be U-shaped or may be defined by only two side surfaces of the track 402.

The next step 610 includes inserting the cantilever member into the lower channel of the lower track 402 such that the cantilever member is placed in an extraneously unbiased position (i.e., without any outside forces, e.g., a user, keeping the cantilever member in a particular position) to align the laser emission plane 204 with the center plane 114 of the lower channel. Said differently, the cantilever member and/or the device are operable to maintain their alignment with the lower channel to ensure the laser 408 projects an installation path for the corresponding track that is in alignment with the lower track 402. The next step 612 includes emitting the laser 408 from the laser level 404 to project a corresponding installation location, e.g., location 412, for an upper track 400 of the track assembly. The device 414 may be operable to slide within the lower channel after inserting the cantilever member in the lower channel 406 and after emitting the laser 408 to provide an installation location corresponding to the entire length of the lower track 402. The process ends at step 614.

A laser level attachment device and method of use have been disclosed that enable users to effectively and efficiently install two or more tracks on building structures using a laser level. The device may be integrated within a laser level or operable to removably couple thereto in a manner that ensure a corresponding track can be installed with minimal time, error, and costs.

What is claimed is:

1. In combination with a track assembly having a lower track with a bottom wall and two opposing sidewalls each having an upper edge, the bottom wall and the two sidewalls of the lower track defining a U-shaped lower channel spanning a length of the lower track and defining a center plane, the improvement comprising:
  a laser level having a laser level track attachment device coupled thereto and operably configured to emit a laser in a direction away from a laser output of the laser level and in a laser emission plane, the laser level track attachment device including a body with a cantilever member:
    projecting in a direction opposite to the direction in which the laser is operably configured to be emitted from the laser level;
    sized and shaped to be complementarily received within the U-shaped lower channel of the lower track such that the laser emission plane is substantially coplanar with the center plane of the U-shaped lower channel and with a lower surface of the cantilever member interposed between the bottom wall of the lower track and the upper edges of the two sidewalls, the lower surface of the cantilever member opposing an upper surface of the body; and
    operably configured to slidably translate within the U-shaped lower channel of the lower track, thereby enabling the laser level to translate along the lower track when the cantilever member is received within the U-shaped lower channel.

2. The improvement according to claim 1, further comprising:
  a lower channel width defined by inner surfaces of two opposing sidewalls of the lower track, respectively, the two opposing sidewalls of the lower track defining the U-shaped lower channel; and
  a cantilever member width separating two opposing outer side faces of the cantilever member, the cantilever member width of a dimension less than, and at most approximately 1/32 of an inch within, a dimension of the lower channel width.

3. The improvement according to claim 1, wherein the cantilever member further comprises:
  a center plane defined by a midpoint between two opposing outer side faces of the cantilever member, the center plane of the cantilever member being substantially coplanar with the laser emission plane and with the center plane of the U-shaped lower channel.

4. The improvement according to claim 1, wherein the body of the laser level track attachment device further comprises:
  a body fastener, wherein the laser level track attachment device is removably couplable to the laser level through the body fastener.

5. The improvement according to claim 4, wherein the body further comprises:
  an alignment indicia disposed on an outer surface of the body, the alignment indicia indicating the center plane defined by the cantilever member.

6. The improvement according to claim 4, wherein the body further comprises:
  a substantially planar upper surface for supporting the laser level; and
  a bore defined by the body and spanning from the lower surface of the cantilever member of the body to the upper surface of the body, the bore having the body fastener disposed therein.

7. The improvement according to claim 6, wherein the body fastener further comprises:
  a head, a distal end, and threads spanning from the distal end to a location along a fastener length, the body fastener operably configured to be placed in a position along a fastener translation path with the head recessed within the lower surface of the cantilever member and the distal end of the body fastener projecting away from the upper surface of the body.

8. The improvement according to claim 6, wherein:
  the substantially planar upper surface of the body defines an upper plane and the lower surface of the body defines a lower plane, the upper plane and lower plane being parallel and noncoplanar.

9. In combination with a track assembly having a lower track with a bottom wall and two opposing sidewalls each having an upper edge, the bottom wall and the two sidewalls of the lower track defining a U-shaped lower channel spanning a length of the lower track and defining a center plane, an improvement comprising:
  a laser level track attachment device removably coupleable to a laser level comprising:
    a body with:

a platform having a substantially planar upper surface defining an upper aperture and a substantially planar lower surface opposing the upper surface of the platform; and a cantilever member projecting from the lower surface of the platform in a direction away from the upper surface of the platform to define two platform flanges, the cantilever member having a lower surface and a distal end, defining a distal aperture, and having a bore spanning from the distal aperture of the cantilever member to the upper aperture of the platform, the lower surface of the cantilever member interposed between the bottom wall of the lower track and the upper edges of the two sidewalls and the cantilever member operably configured to slidably translate within the U-shaped lower channel of the lower track, thereby enabling the laser level to translate along the lower track when the cantilever member is received within the U-shaped lower channel; and a threaded fastener disposed within the bore, having a head, and operably configured to be placed in a position along a fastener translation path with the head recessed within the distal end of the cantilever member.

10. The improvement according to claim 9, wherein:
the distal end of the cantilever member includes a distal area defined by perimeter edges of the distal end of the cantilever member and defining a distal plane, and the substantially planar upper surface of the platform includes an upper area defined by perimeter edges of the upper surface of the platform and defining an upper plane, the upper plane of the platform and the lower plane of the cantilever member being parallel and noncoplanar.

11. The improvement according to claim 9, wherein the cantilever member further comprises:
a trailing end, a leading end opposing the trailing end, and a cantilever member length separating the trailing and leading ends of the cantilever member; and
a cantilever member width separating two opposing outer side faces of the cantilever member disposed between the trailing and leading ends of the cantilever member, the cantilever member width of a substantially uniform dimension spanning the cantilever member length.

12. The improvement according to claim 11, wherein:
the two platform flanges include the substantially planar lower surface of the platform, each having uniform widths spanning from an outer side face of the cantilever member to an outer edge of the platform.

13. The improvement according to claim 9, wherein:
the cantilever member is centrally disposed on the lower surface of the platform.

14. A method of aligning two complementary track structures with a laser level, the method including the steps of:

providing a track assembly having a lower track with a bottom wall and two sidewalls, the bottom wall and the two sidewalls of the lower track defining a U-shaped lower channel spanning a length of the lower track and defining a center plane;

providing a laser level operably configured to emit a laser in a direction away from a laser output of the laser level and in a laser emission plane;

providing a laser level track attachment device including a body with a cantilever member;

coupling the lower track to a building structure to expose the U-shaped lower channel;

inserting the cantilever member into the U-shaped lower channel of the lower track such that the cantilever member is placed in an extraneously unbiased position to align the laser emission plane with the center plane of the U-shaped lower channel;

emitting the laser from the laser level to project a corresponding installation location for an upper track of the track assembly; and sliding the cantilever member within the U-shaped lower channel after inserting the cantilever member into the U-shaped lower channel and after emitting the laser from the laser level, the cantilever member:
  sized and shaped to be complementarily received within the U-shaped lower channel of the lower track such that the laser emission plane is substantially coplanar with the center plane of the U-shaped lower channel and with a lower surface of the cantilever member interposed between the bottom wall of the lower track and the upper edges of the two sidewalls, the lower surface of the cantilever member opposing an upper surface of the body; and
  operably configured to slidably translate within the U-shaped lower channel of the lower track, thereby enabling the laser level to translate along the lower track when the cantilever member is received within the U-shaped lower channel.

15. The method according to claim 14, further comprising:
providing the lower track with a channel width defined by inner surfaces of two opposing sidewalls of the lower track, respectively, the two opposing sidewalls of the lower track defining the U-shaped lower channel; and
providing a cantilever member width separating two opposing outer side faces of the cantilever member, the cantilever member width of a dimension less than, and at most approximately $1/32$ of an inch within, a dimension of the lower channel width.

16. The method according to claim 14, further comprising:
a body fastener, wherein the laser level track attachment device is removably couplable to the laser level through the body fastener.

* * * * *